(12) United States Patent
Bech et al.

(10) Patent No.: US 7,521,105 B2
(45) Date of Patent: Apr. 21, 2009

(54) CONNECTION BETWEEN COMPOSITES WITH NON-COMPATIBLE PROPERTIES AND METHOD FOR PREPARATION

(75) Inventors: Anton Bech, Ringkøbing (DK); Frank A. Hoelgaard Hahn, Ringkøbing (DK)

(73) Assignee: Vestas Wind System A/S, Ringkobing (DK)

( * ) Notice: Subject to any disclaimer, the term of this patent is extended or adjusted under 35 U.S.C. 154(b) by 278 days.

(21) Appl. No.: 10/548,060

(22) PCT Filed: Apr. 22, 2003

(86) PCT No.: PCT/EP03/04171

§ 371 (c)(1),
(2), (4) Date: Sep. 6, 2005

(87) PCT Pub. No.: WO2004/078461

PCT Pub. Date: Sep. 16, 2004

(65) Prior Publication Data

US 2006/0083907 A1    Apr. 20, 2006

(30) Foreign Application Priority Data

Mar. 6, 2003 (EP) ............... PCT/EP03/02292
Mar. 6, 2003 (EP) ............... PCT/EP03/02293

(51) Int. Cl.
*B32B 3/00* (2006.01)
(52) U.S. Cl. ............... 428/60; 428/114; 416/229 R
(58) Field of Classification Search ............... 442/242; 428/412, 60, 212, 114; 156/304.1; 416/229 R, 416/230
See application file for complete search history.

(56) References Cited

U.S. PATENT DOCUMENTS

| 3,101,290 | A | * | 8/1963 | Paul | 156/137 |
| 3,481,807 | A | * | 12/1969 | Kanamori | 156/159 |
| 3,691,000 | A | * | 9/1972 | Kalnin | 428/114 |
| 3,713,753 | A | * | 1/1973 | Brunsch | 416/226 |
| 4,000,956 | A | * | 1/1977 | Carlson et al. | 416/230 |
| 4,077,740 | A | * | 3/1978 | Sobey | 416/230 |
| 4,533,397 | A | * | 8/1985 | Wingler et al. | 514/162 |
| 4,976,587 | A | * | 12/1990 | Johnston et al. | 416/230 |
| 5,108,262 | A | * | 4/1992 | Crane | 416/230 |
| 5,520,532 | A | * | 5/1996 | Reinfelder et al. | 425/500 |
| 6,056,838 | A | * | 5/2000 | Besse et al. | 156/75 |
| 6,287,122 | B1 | * | 9/2001 | Seeram et al. | 433/220 |

(Continued)

FOREIGN PATENT DOCUMENTS

| GB | 2 378 995 | 2/2003 |
| WO | WO-02/081189 | 10/2002 |
| WO | WO-03/078832 | 9/2003 |
| WO | WO-03/078833 | 9/2003 |

*Primary Examiner*—N. Edwards
(74) *Attorney, Agent, or Firm*—Stites & Harbison PLLC; Marvin Petry; Stephen J. Weyer

(57) ABSTRACT

A connection between composites (10, 12) with non-compatible properties and a method of preparing of such connections are provided. The composites comprise first and second type fibres, respectively, as well as resin. The connection comprises a transition zone (52) between the composites (10, 12) having a layered structure. The transition zone may optionally comprise a transition member and the transition member may optionally be integrated with one or more of the composites. Examples of non-compatible properties where the present connection will be appreciated are great differences in stiffness, e.g. Young's modulus, or in coefficient of thermal expansion.

42 Claims, 5 Drawing Sheets

U.S. PATENT DOCUMENTS 7,153,576 B2 * 12/2006 Wang et al. .................. 428/412
7,300,894 B2 * 11/2007 Goodell et al. ............... 442/242
7,364,407 B2 * 4/2008 Grabau et al. ........... 416/229 R

* cited by examiner 10    12

10    13    12

10    40    12

10    42    12

CONNECTION BETWEEN COMPOSITES WITH NON-COMPATIBLE PROPERTIES AND METHOD FOR PREPARATION

TECHNICAL FIELD OF THE INVENTION

The invention relates to fibre reinforced composites. In particular, the invention relates to permanent connections between composite members comprising different types of reinforcement fibres.

BACKGROUND OF THE INVENTION

When designing structures of composite materials, the optimum material with regard to strength, weight, E-modulus and cost etc. is often not the same for all parts of the structure. For example, in a spar for a wind turbine blade the preferred material for the base part may be a glass fibre reinforced composite due to low cost and limited mechanical requirements whereas the preferred material for a load bearing outer part like a flange may be carbon fibre reinforced composite due to the higher stiffness and lower weight The physical properties, for example stiffness and thermal expansion, are very different, however, and it is the general conception in the art that such parts cannot be effectively connected.

OBJECTS OF THE INVENTION

It is the object of the invention to provide an effective permanent connection between two composite members for example being reinforced with different reinforcement fibres.

It is another object of the invention to provide a method for preparing such connections.

DISCLOSURE OF THE INVENTION

The above and more objects are realised by the invention as described and explained in the figures, preferred embodiments and claims.

The connection according to the invention may provide a stable relative fixing of a first composite member and a second composite member having substantially the same properties. It will be appreciated, however, that the connections may also be between composite members having rather different properties. For example composites being reinforced with carbon fibres, which typically have coefficients of thermal expansion (hereinafter CTE) near of even below zero, may be connected to composites being reinforced with glass fibres, which have a substantially higher CTE.

The invention concerns a connection between a first composite member comprising first type fibres and a first resin, and a second composite member comprising second type fibres and a second resin. The connection comprises a transition zone having a layered structure. By transition zone is meant the volume of the connection that does not have the same composition and the same structure as the bulk of either of the connected composite members. The transition zone comprises the volume between the two composite members and may in some cases also include a part of one or more of the composite members.

By first composite member is referred to the part of the final connected structure having a structure substantially corresponding to an equivalent separately prepared first composite member and vice versa for a second composite member. Any one of the composite members may hence be prepared partially or fully in advance of the formation of the connection or the composite member may be prepared as an integrated part of the process of preparing the connection.

The volume between the composite members may optionally be fully or partially occupied by a transition member. This transition member may be prepared prior to the establishing of the connection, it may be prepared directly in the transition zone as part of the establishing of the connection or any combination of these.

Each of the composite members may, independently, be uncured, pre-consolidated, partially or fully cured at the time of establishing of the connection. Likewise, a transition member, which is partially or fully prepared prior to the establishing of the connection, may be uncured, pre-consolidated, partially or fully cured at the time of the establishing of the connection. However, it is preferred that a transition is not fully cured at the time of the establishing of the connection.

The connected structure may be established (i.e. laid up) in only one operation. By one operation is meant, that both the composite members and the transition zone is prepared in connection to the other parts, typically but not necessarily followed by pre-consolidation or co-curing of the complete structure. This type of preparation is particularly useful when a transition member is not used.

Another way to establish the connection is to connect two members. Examples thereof may be:

Positioning composite members near or in contact with each other and establishing a transition zone, optionally via a transition member, prepared 'onsite'.

Connecting a composite member, which is prepared for connecting for example by having an incorporated partial transition zone, to another composite member which, optionally, is also prepared for the connection;

Connecting a composite member, which is prepared with a partially or fully integrated transition member, to another composite member which, optionally, is also prepared for connection;

Connecting a composite member to a transition member and preparing a further composite member directly onto the transition member; etc.

Alternatively, the connection may be established by combining three or more separate members (e.g. two composite members and one transition member, three composite members and no transition member, three composite members and one transition member, etc.).

Connections according to the invention may be used for connecting composite members in any direction relative to the main fibre orientation or orientations (e.g. parallel side by side, at an angle (orthogonal or any other) or parallel end to end). If fibres or layers comprising fibres are interlaced into a composite member, it is preferred, however, that the interlaced fibres are oriented at an angle to the interface between the composite members or at an angle to the interface between the composite member and the transition member. This will tend to increase the mechanical strength of the contact relative to a parallel orientation.

The term composite member herein denotes any type of composite material comprising fibres, cured or uncured, irrespective of the structure being layered or not. Pre-forms and pre-consolidated pre-forms—cured or uncured—are important subgroups of composite members. In a preferred embodiment, a first composite member comprises first type fibres and first type resin, and a second composite member comprises second type fibres and second type resin.

A transition zone as well as a transition member comprises a resin and fibres. The fibres may be provided in any suitable form including in prepregs, semi-pregs, woven or non-woven fabrics, mats, pre-forms, pre-consolidated pre-forms, individual or groups of fibres, tows, tow-pregs, etc. During lay-up (i.e. preparing up to the point before consolidation and/or curing of the resin) of a transition zone or a transition member, resin need not be comprised in the layers comprising fibres (e.g. a prepreg or semi-preg) or between the layers comprising fibres. However, the resin should form a continuous matrix after the curing. Resin need not be comprised in or between two adjacent layers comprising fibres. In a preferred embodiment an adhesive may in this case be provided between at least some of such pairs of layers to at least temporarily and at least partially fix the adjacent layers comprising fibres.

By prepreg is meant a substantially or fully impregnated collection of fibres, fibre tows, woven or non-woven fabric etc. By semi-preg is meant a partially impregnated collection of fibres or fibre tows. The partial impregnation provides for enhanced removal of gas through or along the dry fibres during consolidation and/or curing. An example of a semi-preg is a layer of fibres (e.g. glass fibres or any other type of fibres mentioned herein) partially impregnated in the upper part and/or in the lower part. Woven and non-woven fabrics are collections of individual fibres or fibre tows which are substantially dry, i.e. not impregnated by a resin. Fibre tows are bundles of a large number of individual fibres, e.g. 1,000's, 10,000's or 100,000's of fibres. Tow-pregs are at least partially impregnated fibre tows.

It is within the scope of the invention to connect three or more composite members with the connection and the method according to the invention as this is considered a collaboration of a number of connections according to the invention.

The transition zone or transition member may be prepared as a pre-form as described below. A pre-form is a composite material comprising fibres and—unless otherwise stated—an uncured resin. The fibres are preferably provided in layers of oriented fibres like for example individual or groups of fibres, fibre tows, fibre tow-pregs, prepregs, semi-pregs, woven or non-woven fabrics or mats. Individual fibres, fibre tows and fibre tow-pregs may in some cases be advantageous over prepregs, since the individual fibres are less bounded and hence may rearrange easier during subsequent processing.

Furthermore, individual fibres, fibre tows and tow-pregs may be advantageous over prepregs in that they may be provided in the pre-form with a greater freedom of mixing and orientation, the price is lower as well as the amount of waste may be lower. The pre-form preferably comprises at least three layers of oriented fibres. Pre-forms having a higher number of layers like e.g. 4, 5, 8, 10, 15, 20, 50, 100 or more layers may be used within the scope of the invention.

By fibres are hereinafter meant particles having an aspect ratio (length/equivalent diameter) of more than 10. By equivalent diameter is meant the diameter of a circle having the same area as the cross sectional area of the particle. However, in a preferred embodiment, the fibres are continuous fibres, i.e. fibres that substantially run from one edge of a pre-form or member to another. The properties of a fibre reinforced composite depend to a large extent on the properties of the fibres. However, the properties of different types of fibres vary considerably. For example, the coefficient of thermal expansion of carbon fibres is very low, and in some cases even negative. The first type fibres and the second type fibres may be any type of fibres having an influence on the properties of the composite member; it is preferred, however, that the fibres are selected from the group consisting of carbon fibres, glass fibres, aramid fibres, synthetic fibres (e.g. acrylic, polyester, PAN, PET, PE, PP or PBO-fibres, etc.), bio fibres (e.g. hemp, jute, cellulose fibres, etc.), mineral fibres (e.g. Rockwool™, etc.), metal fibres (e.g. steel, aluminium, brass, copper, etc.), boron fibres and any combination of these.

In a preferred embodiment the first type fibres are carbon fibres and the second type fibres are glass fibres or the first type fibres are glass fibres and the second type fibres are carbon fibres. It is particularly interesting to connect composites with these fibre types as carbon fibres are very stiff and light and glass fibres are very affordable. In another closely related embodiment, the first type fibres are carbon fibres and the second type fibres are glass fibres or vice versa and both the first and the second type resin are epoxy-based.

By carbon fibres is hereinafter meant fibres where the main component is carbon. Hence, by this definition carbon fibres comprise fibres with graphite, amorphous carbon or carbon nano-tubes. Thus, carbon fibres produced via for example a polyacrylonitril-route or a pitch-based route are comprised by this definition.

The fibres comprised in the transition zone and/or the transition member and/or the composite members being connected may be a mixture of more than one type of fibres.

For example, a combination of glass fibres and carbon fibres may be used, but any combination of two or more of the fibre types mentioned herein is feasible. The mixture may be homogeneous, with different concentrations in separate fibre layers or areas or with different concentrations of fibres within any fibre layer. Mixing of fibres may be advantageous, since this opens for tailoring of material properties, for example from a combined stress/cost-perspective.

The resin for the composite members, the transition zone and the optional transition member may be provided as liquid, semisolid or solid resin. The resin may be a thermoplastic or a thermosetting resin, it is preferred to use a thermosetting resin, however, for reasons of chemical and thermal stability as well as ease of processing. The resin may for example be based on unsaturated polyester, polyurethane, polyvinylester, epoxy, thermoplastics or similar chemical compounds, including combinations of these. In a preferred embodiment the first type resin and the second type resin have substantially the same composition. This is preferred as it reduces compatibility problems. In a preferred embodiment of the invention, the resin is provided as a liquid and the resin is introduced by Resin Infusion, Resin Transfer Moulding, RTM, or Vacuum Assisted Resin Transfer Moulding, VARTM, into an entity comprising several layers comprising fibres (e.g. fibre tows or any other suitable collection comprising fibres mentioned herein). The entity comprising fibres may for example be a transition zone, a transition member, a composite member or any combination of one or more of these. Besides the layers comprising fibres, the entity may or may not further comprise a resin and/or an adhesive. In one embodiment, the entity comprises two adjacent layers comprising fibres having no adhesive or resin between the layers prior to the introduction of the liquid resin as described previously in this section. In another embodiment, adhesive and/or resin is provided between all layers comprising fibres in the entity prior to the introduction of the liquid resin as described previously in this section.

The main function of the adhesive is to immobilise the fibres as they are placed on top of the adhesive. This can be achieved by having a tacky adhesive, whereby the fibres stick to the tacly adhesive. The adhesive may be any tacky material, or a solid with a tacky surface and the adhesive may for example comprise polyester, polyurethane, polyvinylester, epoxy or similar compounds or a combination of these. It is within the scope of the invention to use any material or combination of materials having a tacky surface including solid materials with tacky surfaces. More than one type of adhesive may be used in one member or transition zone. For example, it is within the scope of the invention to use the resin as an adhesive between layers of fibre tows, where a resin is provided, or to use a second type of resin below the first layer of fibre tows.

In another preferred embodiment, the resin is a solid. An entity comprising several layers of oriented fibre tows, which may optionally have been immobilised previously during fibre laying by an adhesive, and a solid resin system is heated under vacuum in order to prepare a pre-consolidated or cured pre-form, which may be part of a transition zone, a transition member or a composite member.

In a further preferred embodiment, the resin is a semisolid and functions both as resin and as adhesive, i.e. during fibre laying, the resin will immobilise the fibres and during subsequent processing, it functions as a matrix material.

The resin may comprise more than one system, for example the resin may comprise two systems or even more systems. It may be advantageous to use more than one resin system to be able to optimise the properties of the resin for the subsequent steps of processing, for example with respect to viscosity and timing/controlling of the curing process. These systems may or may not be based on the same type of resin, however, it is preferred that such systems are based on the same type of resin such as two or more epoxy-based systems. In another preferred embodiment, the resin types differ but the resins are compatible. In a further preferred embodiment, the resin comprises two substantially epoxy-based systems. The two epoxy-based systems may comprise a common component. The common component may for example be a common catalyst, a common amine component or a common epoxy component, however, it is preferred that the common component is an epoxy component. A resin comprising two epoxy-based systems with a common epoxy component may comprise an amine-component of a first epoxy-based system that will react to the common epoxy component at a first relatively low temperature, such as below 50° C. and preferably about room temperature. At this first temperature, a second epoxy-based system is preferably non-reactive or the reaction takes place at a very low rate. Since the reaction rate of the second epoxy-based system should be very low, the second epoxy-based system may advantageously be catalysed by a catalyst, which is non-active until activated. This activation may for example be by UV-light, by addition of a compound or by heating; it is preferred, however, that the catalyst is activated by heating.

The resin may for example be distributed as discrete points, as random or organised lines, continuous or non-continuous layers or areas or any combination of these. Furthermore, the resin or additional resin may be infused during processing.

Besides fibres and resin, composite members, the transition zone and—if present—the transition member may for example comprise one or more of fillers (e.g. a cheap inert material) and/or solvents and/or diluents and/or rheological agents and/or viscosity adjusting agents.

Traditionally, gas enclosed in the pre-form prior to and during curing has been removed in the direction of the fibres, i.e. in the plane of a resin layer. Hence, the larger the structure, the longer the gas has to travel to be released from the structure. The risk that gas becomes trapped inside a cured structure is hence increased with the size of the structure. It appears that the problem with entrapped gas is particularly pronounced when the reinforcing with unidirectional fibres. It may be speculated that this is due to the very close packing of the fibres, which may arise in some areas of a composite reinforced by unidirectional fibres. However, problems concerning entrapped gas may also be present in other types of fibre orientation e.g. biaxial or random orientations. In a preferred embodiment of the present invention the connections are therefore prepared to enhance removal of air from within the connections in a direction substantially orthogonal to the surface. This may for example be realised by having a non-continuous layer of resin within the transition zone.

By gas is herein meant entrapped atmospheric air as well as gaseous products, by-products and starting materials related to the preparation process.

The method according to the invention may be adapted to automated processing. For example, in the production of a transition zone or a transition member, a robot may advantageously distribute layers comprising fibres, resin and, optionally, adhesive. Automation is facilitated by an at least partial immobilisation of fibres during laying, by an adhesive which will prevent or at least greatly reduce disturbance in the layers comprising fibres. Furthermore, when the adhesive is only applied to selected areas of the ground plan of the transition zone or the transition member, time is saved compared to distribution of resin over the entire ground plan.

Resin systems may contain components, which may be irritant or harmful when in contact with naked skin, if ingested or inhaled. Avoidance of direct contact is therefore highly desirable. Since the processes according to the invention are particularly suited for automation, the products and processes according to the invention represent a significant improvement to the working environment.

DESCRIPTION OF THE DRAWINGS

Figure 1:
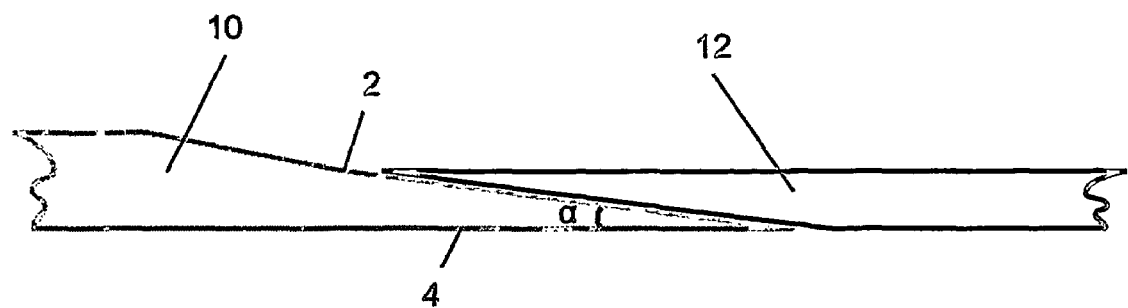
FIG. 1 shows the general conception of the angle between the overall plane of the interface between the transition zone and one of the composite members.

All the figures are highly schematic and not necessarily to scale, and they show only parts which are necessary in order to elucidate the invention, other parts being omitted or merely suggested.

In some of the figures separate layers comprising fibres are indicated. To increase clarity the number of layers shown is limited, and in real connections and composite members the number of layers may in some cases be considerably higher like for example 10's or 100's. The distance between the layers, the thickness of layers and the angles are examples of schematic parts.

The physical properties of fibre reinforced composites are to a large extent dictated by the reinforcement fibres. This includes properties like the coefficient of thermal expansion, CTE, and Young's modulus. Hence, a thoroughly connection is for example relevant when a composite comprising carbon fibres are connected to a composite reinforced by another type of fibres, since the CTE of carbon fibres is very low and may even be negative. However, the same type of connections may be used for strong connections between composites reinforced by other types of fibres. The fibres may be any of the fibre types mentioned previously in this description. A connection according to the invention may for example be used for connecting a carbon fibre reinforced composite to a glass fibre reinforced composite.

The connection according to the invention is best appreciated when a significant difference in properties exists between the composite members to be connected, e.g. a first and a second composite member. For example the difference in CTE of the composites may be greater than $3 \times 10^{-6}$ °C.$^{-1}$ or even greater than $5 \times 10^{-6}$ °C.$^{-1}$ or the difference in Young's modulus may be greater than 25% of the lower value for the composites or even greater than 100% of the lower value. In many cases composites having even greater differences in properties may be connected by a connection according to the present invention. However, a connection according to the invention is also usable when the differences in the properties are smaller.

The transition zone should have a layered structure, i.e. comprise layers comprising fibres. The number of layers may vary considerably dependent on the design of the connection and the size and type of composite members. In some cases only a few, for example 2, 3, 4, 6 or 10 layers are used whereas in other cases a higher number, for example 20, 30, 50, 100 or more layers are needed to obtain the desired quality of the connection. The degree of laminated structure is often reduced during processing. For example pre-consolidation of a transition zone or a transition member tends to homogenise the structure. The structure of the transition zone is layered to enhance controlled orientation of the fibres, to facilitate optimisation of the reduction of stress between the composites as well as to facilitate ease of production like for example enhance suitability for automation of the production.

The fibres may be provided in any desirable orientation in the transition zone like for example unidirectional, biaxial or random. However, the fibres are preferably oriented to reduce the stress between the transition zone and the composite members and/or reduce the stress between the composite members as well as to strengthen areas of the final structure which will be exposed to a higher stress during service.

The orientation of fibres may or may not be the same in all the layers comprising fibres within the transition zone; however, in a preferred embodiment the fibres are oriented substantially the same way in all the layers of fibres. One or more layers of fibres may for example be oriented in another manner than other layers, if a stress analysis suggests a multi-axial fibre orientation. In another preferred embodiment, layers comprising first type fibres are mainly unidirectional and layers comprising second type fibres are mainly biaxial. Another way to strengthen an area of the final structure which will be exposed to higher stress during service, is to increase the amount of fibres in that area.

The resin may for example be distributed as discrete points, as random or organised lines (preferably at an angle to the fibre orientation), continuous or non-continuous layers or areas or any combination of these. In a preferred embodiment, gas may escape orthogonal to the direction of the fibres through non-continuous layer of resin. Resin or additional resin may, furthermore, be infused during processing.

The resin may be provided between two layers comprising fibre for instance individual or groups of fibres, fibre tows, fibre tow-pregs, prepregs, semi-pregs, woven or non-woven fabrics or mats. This is the preferred positioning of resin and when this positioning is used, it is highly desirable that the resin is distributed in non-continuous layers. However, the resin may also be provided in contact with only one layer comprising fibres, i.e. at the top or at the bottom of the transition zone or transition member. In this case, it is preferred to provide the resin at the bottom of the transition zone or transition member and the resin may be provided in a continuous layer as gas will not usually have to escape through the resin layer. In a preferred embodiment, resin is only provided at the top and/or the bottom of the transition zone or transition member, i.e. only adhesive is provided between the layers comprising fibres. In another preferred embodiment, resin is only provided at the bottom of the transition zone or transition member, i.e. between the layers comprising fibres only adhesive is provided.

In a preferred embodiment, the resin is provided to form a non-continuous layer or layers, as this facilitates removal of gas during a subsequent consolidation and/or curing of the transition zone, the transition member or the composite member. The resin is preferably semi-solid and may stick to and/or at least partially immobilise fibres of one or more layers. In another preferred embodiment, the resin is distributed to form a pattern of solid or semisolid particles, and these particles may for example be sprinkled over a layer of fibres. Alternatively, discrete resin or adhesive dots may for example be formed from a resin provided as a liquid. A liquid resin may also be provided as a line or several lines, which may form an oriented pattern, a random pattern or a combined pattern. A different approach to a non-continuous layer of resin is a sheet of resin wherein a number of through-going holes are provided. As it is obvious from these examples of resin patterns, a person skilled in the art will be able to provide other patterns without departing from the inventive idea of the invention.

Examples of preferred embodiments of continuous layers of resin are
- layers prepared by distribution of a liquid resin,
- layers prepared by infusion of resin into or between layers comprising fibres,
- layers prepared from a sheet of solid resin,
- some but not all prepregs, etc.

The adhesive should at least partially immobilise the fibres in contact with the adhesive. The adhesive may be any type of adhesive. The adhesive should be compatible to the resin, however, and is preferably a resin-type adhesive and more preferably the adhesive is related to the resin of the transition zone, the transition member or the composite member in the sense that it comprises compatible chemistry. One way to ensure compatibility between the resin and the adhesive is to use substantially the same composition. In a preferred embodiment, the composition of the adhesive is the same as the composition of the adhesive. It is within the scope of the invention to use more than one type of adhesive in a transition zone, a transition member or a composite member. For example some portions of adhesive may have the same composition as the resin, whereas other portions may have a different composition.

The adhesive may in principle be provided in the same patterns as the resin, however, it is preferred to provide a less dense pattern for the adhesive to save time. It is important to keep in mind that the purpose of the adhesive is to ensure that the layers comprising fibres are at least partially immobilised to facilitate fibre laying. Furthermore, the adhesive will often increase the mechanical strength and hence improve the handleability of an unconsolidated and uncured pre-form relative to the equivalent structure without adhesive by at least partially fixing adjacent layers of fibre to each other. One way to ensure a facilitation of the fibre laying is to provide a strip of adhesive close to or exactly where the layers comprising fibres are initiated during fibre laying. Other embodiments are also feasible such as dots, broken or curved lines, etc. In principle continuous layers may be used; however, the advantage of using an adhesive over using a resin will be reduced thereby. In some cases, automation may favour an adhesive pattern, where the adhesive is applied in a continuous line, for example as a zigzag or crisscross pattern. A person skilled in the art will appreciate the advantage of providing only a limited amount of adhesive compared to either a full or nearly full layer of resin or cross-ply stitching, particularly with respect to the time saved during processing and ease of automation.

Three-dimensional forming may be applied for reducing the interfacial stress in a connection between composite members. A three-dimensional form may for example be realised by selective initiating and/or terminating of for example fibre tows or other types of layers comprising fibres during fibre laying. Traditionally, such three-dimensional forms will involve the creation of a large contact area orthogonal to the main stress direction in at least one axis. In FIG. 1 it is observed that the contact area may be increased by decreasing the angle a between the overall plane of the interface 2 between the transition zone and a composite member 10 and a surface 4 of the composite member 12. A distance much greater than the orthogonal distance between adjacent layers comprising fibres separates the terminations of the layers of fibres in the tapered section (2, 4), which will tend to reduce the interfacial stress. Furthermore, if the angle a is sufficiently low, the end of a layer comprising fibres of the first composite member may be placed over an adjacent layer comprising fibres from the second composite member in the transition zone. This may lead to a side-by-side coupling of the fibre layers, which is favourable compared to an end to end coupling.

The fibres in a composite member near the transition zone may for example be oriented substantially parallel to the overall plane of the interface between the transition zone and that composite member, the fibres may be oriented substantially parallel to a surface of that composite member, the fibres may be oriented in a combination of these orientations, the fibres may be provided with a random distribution, etc. It is preferred, however, that the fibres in the composite members near the transition zone are substantially parallel to a surface of the composite member as this may provide an—even if limited—side-by-side coupling between the fibres. This is particularly the case when the angle a is low. Preferably the angle a should be less than about 10° but an even better connection may by obtained when the angle is less than about 2°. If the utilised fibres are very stiff such as carbon fibres a may in some cases advantageous be as low as 0.5° to 1° or even lower.

If thick composites are to be connected, low angles may be difficult to realise as this will require an unreasonable long transition zone. In such situations it may be advantageous to use a zigzag interface or to use a number of connections having the angle α on top of each other. This may for example be realised by separating the thick composite members into a number of thinner composite members or flanges and then connect the thinner pairs of composite member or flanges individually on top of each other or near each other.

The transition zone may be prepared in several ways. In a preferred embodiment, the transition zone comprises a transition member. The transition member is composite material comprising layers comprising fibres and a resin. In a preferred embodiment the transition member is prepared independently of the composite members to be connected. In this embodiment the transition member may for example be prepared as a pre-form and optionally be pre-consolidated prior to the connection to the composite members. A method for preparing a connection involving a transition member may comprise the steps of:

provinding at least one layer comprising first type fibres for the transition member providing at least one layer comprising second type fibres for the transition member providing a resin in contact with at least one of the layers comprising fibres for the transition member connecting the transition member to the first composite member connecting the transition member to the second composite member curing the transition member, and optionally co-curing the first and/or the second composite member with the curing of the transition member.

The layers comprising first type fibres or second type fibres, respectively, may be the same layer or layers if the fibre types are mixed. The resin may or may not have the same composition as one of the composite members, however, it is preferred that the resin is compatible with the resin of the composite members and more preferably the resin composition is substantially the same as the composition of one or both of the composite members. The resin is preferably but not necessarily non-continuous in the sense that gas may be removed from the transition member orthogonal to a layer of resin. The transition member may for example also comprise an adhesive between two or more of the layers comprising fibres if this is desirable. One or more of the composite members may be co-cured together with the curing of the transition member. In a preferred embodiment, the complete structure is co-cured in one operation.

In a preferred embodiment, the transition member is pre-consolidated, preferably prior to the connection of the composite members. Pre-consolidation of the transition member is particularly advantageous when at least one of the composite members to be connected is cured prior to forming of the connection, as pre-consolidation may reduce shrinkage during curing.

In a preferred embodiment an uncured or pre-consolidated transition member may be transported or stored for a prolonged period of time such as weeks or months without premature curing.

The layers of the layered structure of the transition zone are typically oriented substantially parallel to the overall plane of the interface between the transition zone and at least one of the composite members or the layers are oriented substantially parallel to a surface of at least one of the composite members. In some embodiments both options are possible and hence the design should be chosen depending on the desired properties of the final structure and the types of composite members involved.

Figure 2:
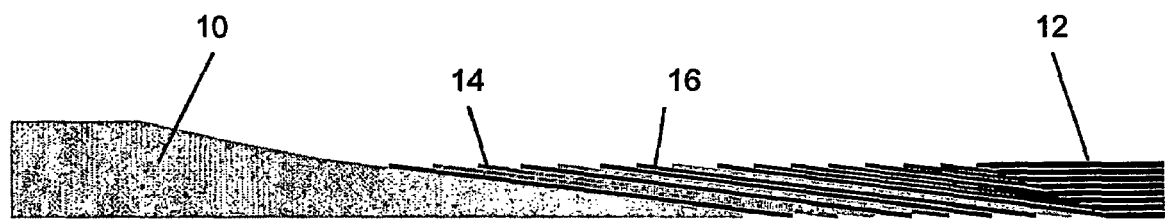
FIG. 2 shows a preferred embodiment of a connection according to the invention having macro grading.

One approach to the designing the transition zone is to provide a gradual change of the composition of the layers comprising fibres from the composition of the first composite member to the composition of the second composite member. In FIG. 2 this gradual change is realised by macro-grading. By macro-grading is meant that the transition zone comprises a number of layers each comprising fibres having either substantially the same fibre composition 14 as the first composite member 10 or substantially the same fibre composition 16 as the second composite member 12. In a preferred embodiment a first side of a stack of such layers is connected to the first composite member 10 and a second side of the stack is connected to the second composite member 12. Hence, the layers are typically oriented parallel to the overall plane of the interface between the transition zone and at least one of the composite members.

The transition zone shown in FIG. 2 are preferably prepared directly onto one or both of the composite members, but other routes of preparation are feasible for example the route involving preparation of a separate transition member. The interface between the first composite member and the transition zone need not be parallel to the interface between the second composite member and the transition zone, however in a preferred embodiment the interfaces are substantially parallel since this provides for an easier manufacturing.

The gradual change may for example be realised by changing the frequency of the two types of layers comprising fibres for example as it is shown in FIG. 2. Other examples are sequences like:

Bulk A-B-A-Bulk B
BulkA-B-A-A-B-A-B-B-A-BulkB
BulkA-B-A-A-A-B-A-A-B-A-B-B-A-B-B-B-A-Bulk B Here A indicates a layer comprising fibres having substantially the same fibre composition as the first composite member, B indicates a layer comprising fibres having substantially the same fibre composition as the second composite member and Bulk indicates the composite member.

The sequence need not be symmetrical and the optimum sequences should be chosen with respect to properties, layer thickness, etc. in the particular situation. The examples of sequences is by no means exhausting for useful sequences and a person skilled in the art will be able to provide a variety of sequences without departing from the conception of the inventive idea.

When the transition zone is prepared directly on one or more composite members the connection may be prepared by these steps:

providing a first composite member
providing at least one layer comprising first type fibres on or in connection to the first composite member or on a previous layer comprising fibres in the transition zone
providing at least one layer comprising second type fibres on or in connection to the first composite member or on a previous layer comprising fibres in the transition zone
providing a resin in contact with at least one of the layers comprising fibres in the transition zone
connecting the structure to the second composite member
curing the transition zone, and
optionally co-curing the first and/or the second composite member together with the with the curing of the transition zone.

The transition zone may be prepared directly on both the first and the second composite member simultaneously if this is desirable.

A method for preparing connections comprising interlaced layers comprising fibre may for example comprise these steps:

providing layers comprising first type fibres
providing a means for at least partially immobilising the fibres, said mean for example comprising an adhesive or a resin
providing layers comprising second type fibres to be at least partially interlaced between layers comprising first type fibres, said layers comprising second type fibres extend beyond the first composite member
providing a resin in contact with at least one of the layers comprising fibres
connecting the structure to the second composite member
curing the transition zone and the first composite member, and
optionally co-curing the second composite member together with the with the curing of the transition zone.

In a similar way the transition zone may be partially incorporated into the second composite member.

The transition zone may be pre-consolidated prior to the curing optionally the pre-consolidation is conducted on the transition zone and at least one of the composite members simultaneously.

The fibres for the layers comprising fibres may for example be provided as prepregs, semi-pregs, woven or non-woven fabrics, mats, pre-forms, pre-consolidated pre-forms, individual or groups of fibres, tows, tow-pregs or a combination of these.

Figure 3:
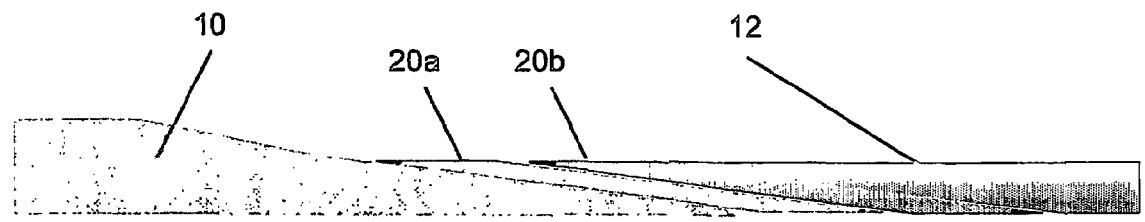
FIG. 3 shows a preferred embodiment of a connection according to the invention having micro grading and details of a micro graded layer.
Figure 3:
Figure 3:
Figure 3:
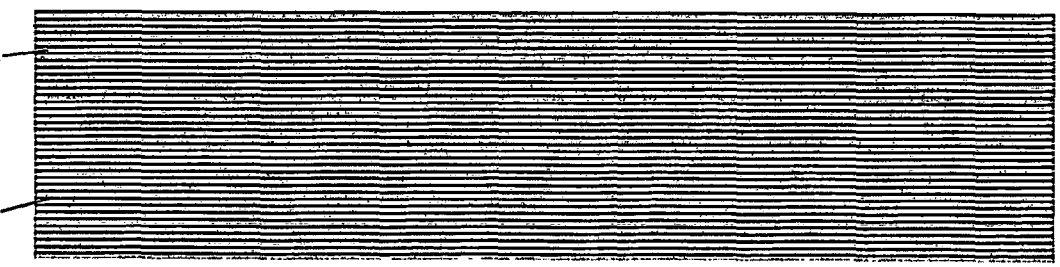
Figure 3:
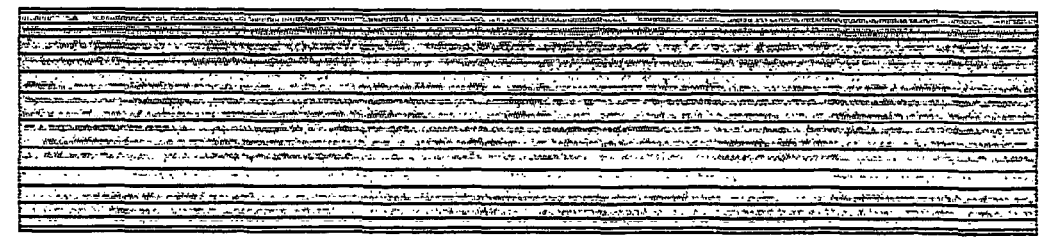

Another approach to gradually changing the composition of the layers comprising fibres involves micro-grading. By micro-grading is meant that the first type fibres and the second type fibres are mixed in at least one layer in the transition zone comprising fibres. Alternatively, a layer comprising fibres or a mixture of fibre types having intermediate properties of first type fibres and second type fibres is present; Particularly properties critical to the connection (e.g. CTE and Young's modulus) should be intermediate to those of the first type fibres and the second type fibres. An example of micro grading is shown in FIG. 3A where the connection has two micro-graded layers 20*a* and 20*b* between the first composite member 10 and the second composite member 12. As it is indicated with the relative shading of 10, 20*a*, 20*b* and 12 in FIG. 3A it is preferred that the ratio of first type fibres to the second type fibres decreases gradually from the first composite member towards the second composite member. The micro-graded members 20, 20*a* and 20*b* may for example be prepared from a thick fibre mat comprising a homogeneous mixture of first type fibres and second type fibres and a resin, but the person skilled in the art will know other ways to realise a micro-graded material. The micro-graded members may for example be prepared from a number of thinner layers comprising fibres. These thinner layers being shown in FIG. 3B and C as dark lines 22. These layers may generally be oriented parallel to a surface of the final structure as indicated in FIG. 3B or parallel to a larger surface of the micro-graded member as indicated in FIG. 3C. It is also within the scope of the invention for example to prepare the transition zone or a transition member directly from thinner micro graded layers comprising for example one layer of fibres, one layer of fibre tows or a prepreg.

In a preferred embodiment of a micro graded connection, the fibres within a micro graded layer comprising a mixture of first type fibres and second type fibres are distributed in a homogeneous or non-homogeneous manner within an individual layer. In FIG. 3D an example of a homogeneous distribution is shown. It is observed that the concentration of tows 15 of first type fibres and tows 17 of second type fibres is constant. The orientation of the first and the second type fibres need not be the same even it this is shown in FIG. 3D. In FIG. 3E an example of a non-homogeneous distribution of fibre tows is shown. It is observed that the concentration of tows 15 of first type fibres relative to tows 17 of second type fibres is much greater near the edge than near the centre of the layer. Other sources for fibres may equally well be used instead of or together with fibre tows. In non-homogeneous layers, the concentration and/or the orientation of the first type fibres are preferably different from those of the second type fibres, but other examples of inhomogeneous manners may be provided by a person skilled in the art in the light of these examples. This type of layers may for example be advantageous if more than two composite members are to be connected or if at least one of the composite members is inhomogeneous.

Figure 4:
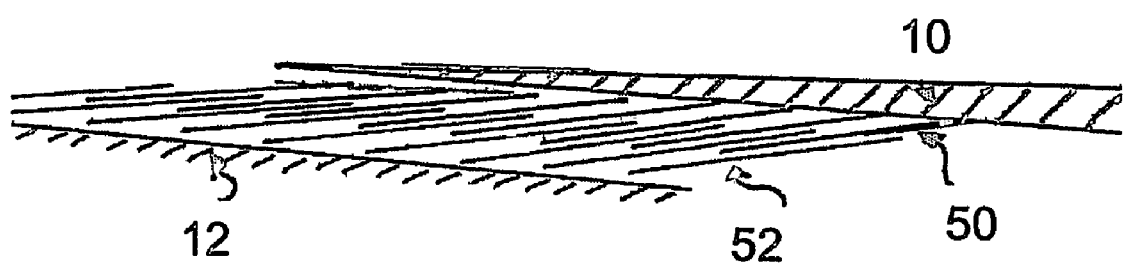
FIG. 4 shows a further preferred embodiment of a connection according to the invention having interlaced layers comprising fibres.

FIG. 4 shows a transition zone comprising two types of layers or sheets comprising fibres, one type 50 comprising fibres having substantially the same fibre composition as the first composite member 10 and another type 52 comprising fibres having substantially the same fibre composition as the second composite member 12. The two types of layers are partially interlaced in the sense that in a part of the transition zone at least one of the types of layers extend beyond the other type of layer. At least some of this part of the transition zone is used for the connection with the composite member having substantially the same fibre composition. Due to the interlaced layers the contact surface is very high and the connection is hence under the right conditions very strong. In a preferred embodiment both types of layers extend beyond the other in a part of the contact zone as shown in FIG. 4.

Figure 5:
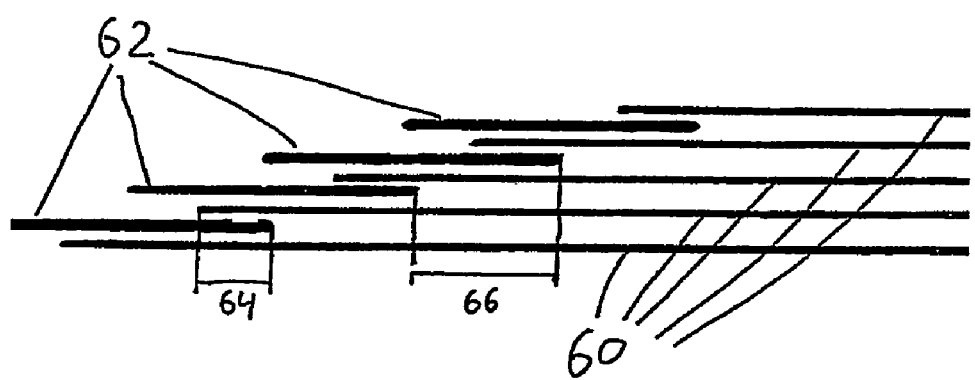
FIG. 5 shows yet another preferred embodiment of a connection according to the invention.

In a preferred embodiment the transition zone is integrated at least partially with one of the composite members or a pre-form. In FIG. 5 an example of such an embodiment is shown. The transition zone may for example comprise layers 62 comprising second type fibres initiated within the first composite member being reinforced by layers 60 comprising first type fibres and extending beyond the first composite member. The distance 64 from the ends of layers comprising first type fibres to the adjacent ends of layers comprising second type fibres should preferably be great enough to prevent or reduce coupling of stress between the layers (see below). It is also preferred that the distance 66 between the ends of adjacent layers comprising first type fibres is great enough to prevent or reduce coupling of stress between the layers. The transition zone having interlaced layers comprising second type fibres is preferably prepared as a part of the preparation of the first composite. In a preferred embodiment, the layers comprising second type fibres are provided as prepregs. The prepregs may be unidirectional prepregs, however, experimental results suggest, surprisingly, that biaxial prepregs comprising the second type fibres provide a better basis for connecting of the pre-form to a structure reinforced by second type fibres. It may be theorised that this is due to better coupling between layers where the relative main fibre orientation is not parallel, however, other effects may take part in this.

Experimental results have shown that the embodiments described in relation to FIG. 4 and FIG. 5 are capable of successfully connecting a glass fibre reinforced base of a spar for a wind turbine blade to a carbon fibre flange reinforced spar. The success in this high performance application indicates the span of the present invention.

Figure 6:
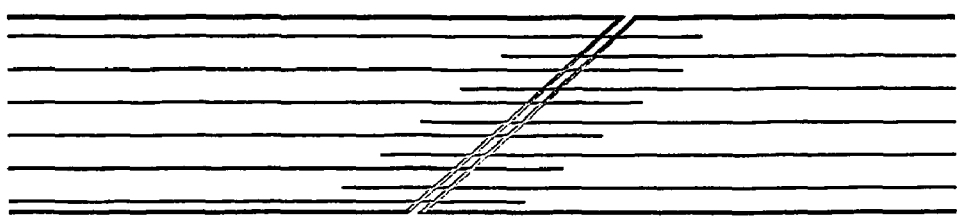
FIG. 6 shows sketches of some other preferred embodiments of connections having interlaced layers comprising fibres.
Figure 6:
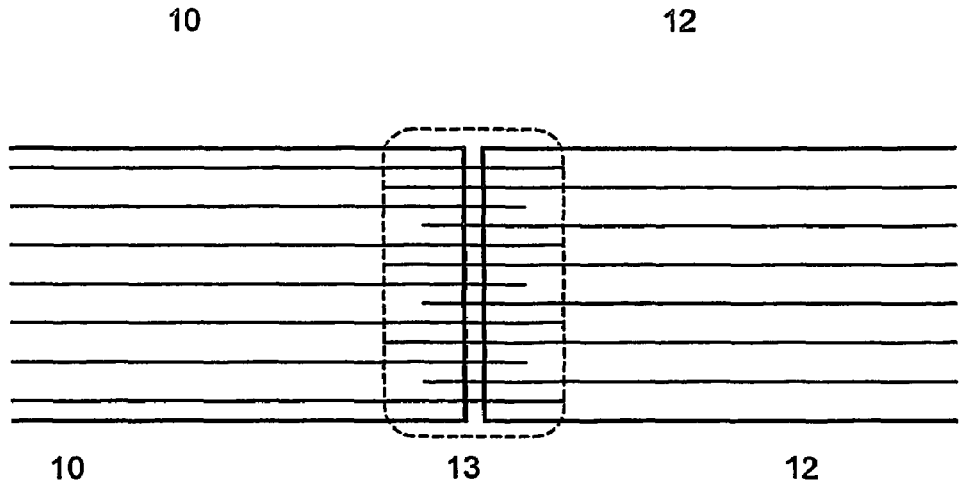
Figure 6:
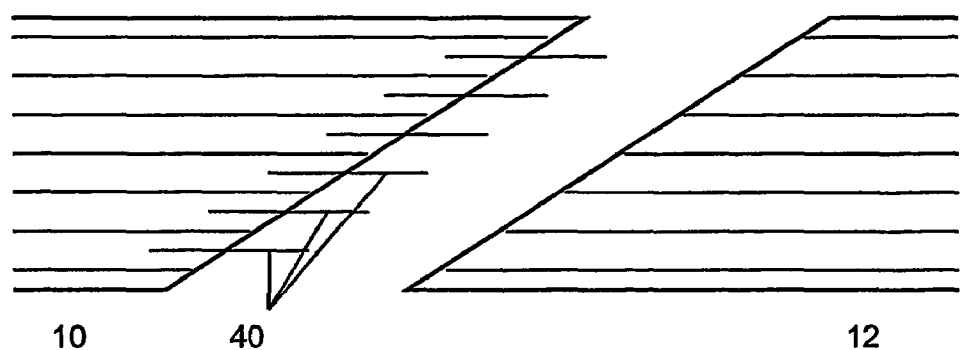
Figure 6:
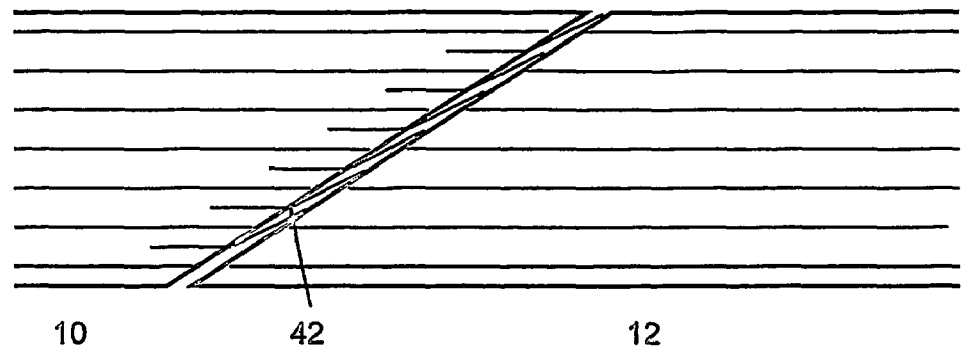

In a preferred embodiment of a connection, the transition zone comprises layers, which comprise fibres, extending from the first composite member into the second composite member and/or layers, which comprise fibres, extending from the second composite member into the first composite member. This preferred embodiment may for example be established in one operation. More preferred embodiments having interlaced layers comprising fibres are shown in FIG. 6. FIG. 6A shows a connection where the layers of each composite member comprising fibres extend into the other composite members 10 and 12. This type of connection is typically prepared simultaneously with the fibre laying, i.e. preparation of both composite members and the transition zone in one operation. In FIG. 6A and B all layers comprising fibres extend into the other composite member, however, this need not be the case unless it is required to achieve the desired strength. For example the transition zone may become thicker if all layers are continued into the other composite, which again may lead to bending of fibres entering into the transition zone. In FIG. 6B the transition zone 13 has been indicated by a broken line as an example of the extent of a transition zone.

FIG. 6B shows an integrated connection between two composite members having an interface which is substantially orthogonal to the surface of the composite members. To reduce the effect of the stress end-condition (see below), the ends of the fibre layers are provided in a zigzag pattern.

In a preferred embodiment of the connection shown in FIG. 6B, a zigzag pattern is also provided in the dimension of the interface orthogonal to the plane shown in the figure. In other words, the line defined by the end of a layer comprising fibres is not a straight line in this preferred embodiment.

FIG. 6C shows an example where the composite member 10 is prepared for connection with composite member 12 in that layers 40 having substantially the same fibre composition as composite member 12 has been interlaced into composite member 10. In FIG. 6D the connection between the composite members is formed. It is observed that the layers 40 are being bent to form the layers 42. The bending is not desirable, but the bending angle may be greatly reduced by decreasing the angle a, which has been defined in relation to FIG. 1. In a preferred embodiment, $\alpha$ is typically kept below 10° as described elsewhere. The layers 42 may or may not comprise a resin (e.g. a prepreg or applied directly), but during curing of the transition zone a resin should be present to ensure formation of a cured matrix of resin.

A method for preparing a connection as shown in FIG. 6A and B wherein the transition zone comprises layers comprising fibres extending from the first composite member into the second composite member and/or layers comprising fibres extending from the second composite member into the first composite member, may for example comprise the steps of:

providing layers comprising first type fibres, at least some of these layers extend into a part of the structure resembling the second composite member providing layers comprising second type fibres, at least some of these layers extend into a part of the structure resembling the first composite member optionally providing a means for at least partially immobilising the fibres, said means for example comprising an adhesive or a resin providing a resin in contact with at least one of the layers comprising fibres optionally pre-consolidating the structure, and curing the structure In a preferred embodiment, the structure is co-cured altogether, however, curing or preconsolidating may be carried out on selected parts of the structure in individual operations.

Figure 7:
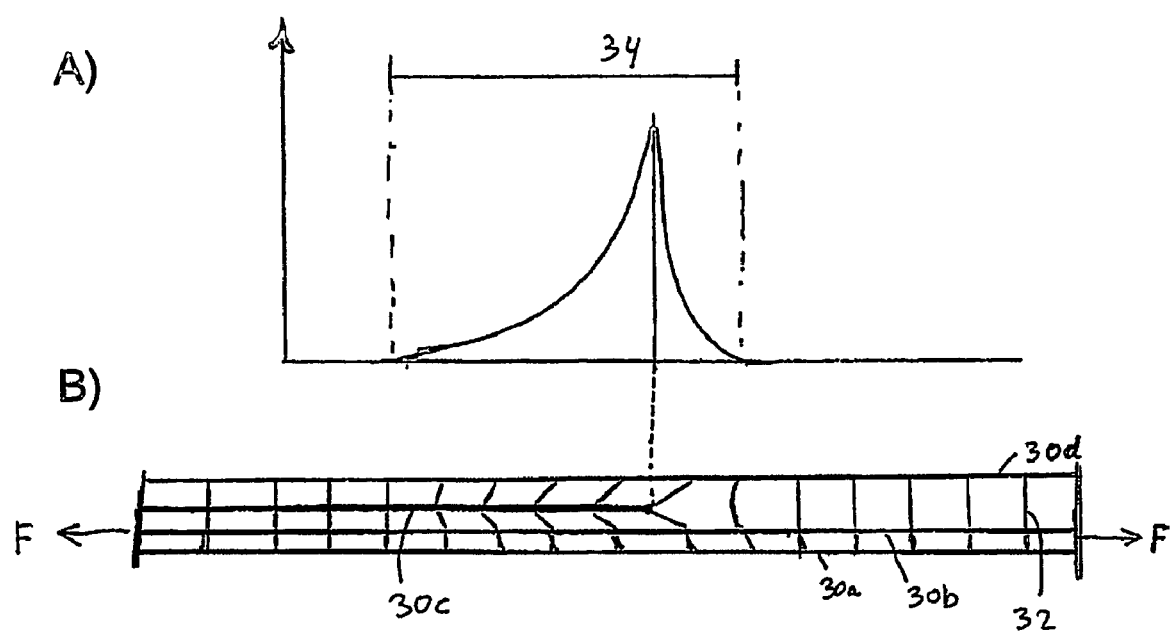
FIG. 7 shows a sketch of the stress distribution near the end of a fibre.

When a fibre reinforced material is stressed by a force F, the matrix material, i.e. the resin, is stressed equally along the layers comprising fibres. However, if a layer comprising fibres is stressed differently for example as it is the case for interlaced, non-continuous layers comprising fibres stress may build up in the resin. In FIG. 7B a schematic illustration of the shear stress in the resin between four layers comprising fibres are shown. The layers 30a, 30b and 30d comprising fibres are continuous layers such as continuous layers comprising second type fibres in the second composite member whereas the layer 30c comprising fibres is a non-continuous layer such as an interlaced layer comprising first type fibres interlaced from a first composite member into a second composite member. The mainly vertical lines represent the local shear stress in the resin, i.e. a vertical line indicates that the resin experiences the average shear stress and an angled line indicates a difference in the experienced shear stress from the average resin. It is observed that a large local difference in the shear stress is present near the end of the layers 30c.

In FIG. 7A the shear stress build up near the end of layer 30c is represented as a schematic plot of the variation in the shear stress in the resin along a line parallel to and near layer 30c relative to the average shear stress in the resin. It is observed that difference in shear stress is greatest at the end of the layer 30c. Furthermore, it is observed that at a certain distance away from the end of layer 30c the shear stress is about the average level of shear stress. When ends of layers comprising fibres are provided closer to each other than the extent 34 of the end-condition of the shear stress, the shear stress may couple between the layers and hence form a weak point, line or plane within the structure. To reduce or prevent coupling of shear stress from the end of one layer to the end of a nearby layer, the distance between the ends of interlaced layers should be greater that the extent of the end-condition. Since the extent of the end-condition is difficult to establish, it is preferred to use a safety margin and hence separate the ends of two adjacent layers by at least two times the extent of the end-condition.

It is also reasonable to ensure that the distance between the nearest layer end of the same type of fibre should be separated by a distance corresponding to the extent of the end-condition, preferably with a safety margin and hence using a factor of two.

The actual extent of the shear stress concentration depends on a number of factors, such as thickness of layers comprising fibres and layers comprising primarily resin, the type of fibres, the type of resin, etc. The extent of the stress concentration may for example be established by modelling or by empirical methods.

When larger structures comprising pre-forms or composite members are to be prepared, this may follow a method wherein the not fully cured material is shaped at least partially plastically. The pre-form may be connected to further preforms before or after shaping to provide a larger structure. The preform may also be connected to other structures. It is preferred but not required that the connections involve a tapered part or layers comprising second type fibres. When the materials have substantially the same properties it may be sufficient to use a tapered section as shown in FIG. I to realise a reasonable connection, however, the greater the difference in properties the greater care should be taken.

Relevant curing processes and processing parameters are known to the person skilled in the art, however, it is preferred that a pressure is applied on the structure and/or a vacuum is applied to the structure as part of the curing procedure. The pressure may be applied via a vacuum in a vacuum enclosure surrounding all or part of the structure. It is preferred that the pressure and/or vacuum is applied on the structure before the curing reaction is commenced as this facilitate the removal of gas from the structure.

The connections and particularly separately prepared transition members as discussed previously may advantageously be pre-consolidated to provide a more homogeneous material with better performance. Transition members may often be considered as preforms.

In a preferred embodiment, the transition member or the transition zone (in the following sections referred to as the element) is treated by pre-consolidation to form a pre-consolidated element as described in the following section. Preconsolidation is particularly useful when the fibres are provided as individual or groups of fibres, fibre tows or fibre tow-pregs compared to fibres provided in prepregs as a lower viscosity may be realised during the pre-consolidation process. This will increase the redistribution of resin and/or fibres, which is highly desirable as it increases the homogeneity of the resulting product. However, pre-consolidation of elements comprising fibres provided in prepregs, semi-pregs, woven or non-woven fabrics and/or mats may also be advantageous.

By pre-consolidation is herein meant a process, whereby gas inside an element is removed and a low porosity element is produced. Pre-consolidation involves redistribution of a resin and optionally a redistribution of fibres. Furthermore, pre-consolidation may involve a limited curing of the resin. Pre-consolidation is particularly useful as it produces a dense element (hereinafter named a pre-consolidated element). Pre-consolidated elements and composites prepared from pre-consolidated elements will be appreciated amongst others due to good reproducibility, low porosity, high homogeneity, high strength, ability to plastically shaping, ability to be connected to other elements and/or other structures, suitability for automation and long shelf life without premature curing.

When the pre-consolidation involves a limited curing, this limited curing may involve a release of up to 50% of the energy that will be released by a complete curing of the resin. However, it is preferred that the extent of curing is limited to an extent that will allow the pre-consolidated element to be deformed plastically. The degree of curing that will allow for plastical deformation of a pre-consolidated element depends amongst others on the resin as well as on the fibre type and fibre content. Generally, it is preferred that the limited curing involves less than about 20% of the energy that will be released by a complete curing of the resin and more preferably that the limited curing involves between 3 to 15% of the energy that will be released by a complete curing.

Generally speaking, the pre-consolidation process should reduce the porosity of the element and it is preferred that the resulting porosity of the pre-consolidated element is less than 5% by volume, preferably less than 2% by volume and more preferably less than 1% by volume. In some cases, a porosity of even 1% may reduce the properties of a composite considerably. In these cases, it will be appreciated that the method and the pre-consolidated element may be produced with porosities well below 1%. For example, a reproduced porosity of about 0.2% by volume was realised for a composite with 60% carbon fibres in epoxy. The reduction of the porosity may for example be a result of exposing the element to a pressure and/or a vacuum in relation to the pre-consolidation process.

The porosity of the pre-consolidated element can not be established directly, as a density is not known and may vary throughout the material. Hence, the porosity should be established by an optical method on a materialographic sample. Preparation of materialographic samples from an uncured pre-consolidated element is very demanding, since the material comprises both a very soft element (i.e. a resin) and a very hard element (i.e. the fibre). To establish a reproducible result, it is hence necessary to cure the element prior to materialographic preparation. This curing should be pressureless to ensure that the porosity is unaffected by the process.

To ensure handleability, the pre-consolidated element should be substantially unsticky, i.e. it should be easily releasable from any relevant surface and it should not leave excessive amounts of resin on a surface when released.

To ensure a long shelf life and/or stability during transportation it is important that the rate of the curing reaction of the bulk of the resin is sufficiently low at room temperature and that a catalyst—if present—is not activated by accident For example, if the catalyst is activated by heating, it should be ensured that the activation temperature is considerably higher than the expected maximum temperature during storage.

In a preferred embodiment, the pre-consolidated elements are at least partially deformable. This may for example be realised through a balanced and limited curing during the pre-consolidation process. In a preferred embodiment, at least a part of a pre-consolidated element is capable of being bent around an axis parallel to the main fibre orientation with a diameter of more than 1 cm, however, in some cases a pre-consolidated element may be bent with a diameter of more than 5 cm by plastic deformation. The low bending diameters may be realised by rearranging of resin and/or fibres or by three-dimensional forming of an element. By three-dimensional forming is herein meant that the thickness (e.g. the number of layers or amount of fibres and/or resin) and/or the form of the ground plan is adjusted for a part of the element relative to the bulk of the element. Typically, only a part of the pre-consolidated element is prepared for very sharp bending, whereas bending around an axis with larger diameters, e.g. 50 cm, may often be realised by all parts of the pre-consolidated element.

The stiffness of a element realised during a pre-consolidation process should ensure that the pre-consolidated element is sufficiently stiff to prevent relaxation of the pre-consolidated element in the length direction of the fibres when placed on a non-flat surface and yet allow for plastic deformation around an axis parallel to the longitudinal direction of the fibres.

The pre-consolidation process often leads to an increase in viscosity of the resin in the element, for example by a partial curing. It is preferred that the viscosity at room temperature is increased by a factor of at least two and more preferably by a factor of at least five, as an increase in viscosity will enhance handleability, strength and unstickyness. In some cases, the viscosity may be increased by a much higher factor of for example 10, 100 or 1000. This is for example the case if part of the resin is injected into the element as a room temperature liquid. Another way to express the increase in viscosity is to look at viscosity directly. It is preferred that the viscosity of the resin in the unconsolidated element is between about 10 to 10,000 cP at the temperature where the pre-consolidation process is conducted, preferably between about 500 to 5,000 cP.

The temperature where the pre-consolidation process is conducted may vary considerably depending particularly on the composition of the resin. Typically, the pre-consolidation temperatures for epoxy-based resin systems are 50 to 90° C. and preferably 60 to 80° C., however, both higher and lower temperatures may be feasible in some systems.

The pre-consolidation process may lead to an increase in the glass transition temperature, $T_g$, of the resin, for example by a partial curing. It is preferred that the $T_g$ of the resin is increased during pre-consolidation by at least 2° C. and preferably by at least 5° C., as an increase in $T_g$ usually indicates an increase in the average molecular weight of the resin, which will enhance handleability, strength and unstickyness. In some cases, $T_g$ may be increased more. This is particularly the case when $T_g$ of the unconsolidated element is very low.

In a preferred embodiment a pre-consolidated element according to the invention with an epoxy-based resin system should typically have a $T_g$ between −10 to +30° C. and preferably a $T_g$ between −5 to 10° C. In some cases, $T_g$ of the resin of the pre-consolidated element is higher than about 0° C. and preferably higher than about 3° C. For the unconsolidated element, $T_g$ of the resin should be below about 5° C. and preferably below about 2° C.

In some cases, curing of a pre-consolidated element without being exposed to a vacuum will result in a material with properties equivalent to a vacuum-cured element, since porosity has been eliminated or greatly reduced during the pre-consolidation process prior to the curing. This may for example be used when preparing a connection in a large structure where the establishing of a vacuum may be very time-consuming.

In a preferred method of pre-consolidating and/or curing an element, the element is placed on a reactor surface like for example a plate, a mould, etc. It is preferred that the reactor surface is flat and that it will withstand heating and/or vacuum. Then a pressure is applied to the element. The pressure may be applied by a press or—preferably—via a vacuum within a vacuum enclosure. If a vacuum is used, then a vacuum enclosure should be obtained prior to pressing. The vacuum enclosure may for example comprise a vacuum bag or it may comprise a reactor surface and a flexible cover connected in a vacuum-tight way to the reactor surface. Gas may for example be evacuated through the reactor surface or through an opening in the vacuum bag or flexible cover. Then pre-consolidation or curing is activated. The activation may take place before and/or during and/or after applying pressure. The activation comprises a reduction of the viscosity of the resin. This may for example be realised by physical means (e.g. heating, addition of solvent, pressure etc.) and/or by a chemical reaction. During the pre-consolidation process, a limited curing may or may not take place. When the porosity has been reduced to a desired level or another object of the pre-consolidation is obtained, the pre-consolidation process is terminated. The termination may for example be a result of exhaustion of a first resin system or cooling of the pre-consolidated element to a temperature, where the curing reaction is sufficiently slow and/or the viscosity is sufficiently high for the pre-consolidated element to achieve the stability needed for the desired shelf life.

In a preferred embodiment, the element to be pre-consolidated or cured is having at least one non-continuous layer of resin, through which gas may be removed during the pre-consolidation or curing process. Hence, the gas need not be removed from the element via one plane of a layer of resin or in a plane of one layer comprising fibres. Thus, the transportation distance and risk of having trapped gas inside the pre-consolidated element is greatly reduced. In a more preferred embodiment, all layers of resin—optionally except from a layer on top of the top layer comprising fibres or below the bottom layer comprising fibres—are non-continuous.

An example of a method for ensuring that gas may continuously be removed from the element during pre-consolidation or curing involves a gradual activation of the pre-consolidation process starting either from the centre of the element and moving towards the surfaces or from a side or edge and moving through the element. For example this may be realised by heating from the reaction surface only, thereby activating the pre-consolidation process gradually from the side of the element in contact with the reaction surface or by controlled microwave heating, thereby activating the pre-consolidation process gradually from the inside of the element and moving towards the surfaces.

The properties of a laminated structure having layers comprising oriented fibres to a large extent depend on the distribution of the main elements of the structure i.e. resin, fibres and porosity. The resin possesses a low strength compared to the fibres and may provide a route for crack propagation through the structure, if too thick layers of resin are present. Porosity may reduce the strength of the structure dramatically but the adversity depends on the size of pores, the shape and the distribution, e.g. the effect of small, isolated spherical pores is limited, whereas larger pores positioned in the interface between resin and fibres may be fatal to the structure.

Consequently it is vital to be able to control the distribution of the elements.

The extent of redistribution or homogenisation during pre-consolidation or curing depends on the viscosity of the resin during the compaction process, i.e. the lower the viscosity the easier the redistribution of the elements. By utilising a pre-consolidation process the viscosity of the resin may be lowered more than what is feasible in the prior art, since the structure is not limited to supporting a particular shape during the process. When the pre-consolidation involves a limited curing of the resin, the viscosity may be further reduced since the limited curing increases the handleability and reduces the sticking of the pre-consolidated element. Hence, pre-consolidation typically allows for redistribution of resin and/or fibres to a greater extent than what may be realised by direct curing. The resulting pre-consolidated elements may possess very low porosity as well as a more homogeneous structure. This may for example result in a composite structure having a less pronounced laminated structure, i.e. where the layers are less pronounced than a corresponding composite structure comprising only elements that were not pre-consolidated prior to curing.

Connections and methods according to the invention are useful for the connecting of two relatively incompatible composite members whereas composite members having compatible properties may also be connected using a connection or a method according to the invention. The extent of the invention is best realised when trying to connect two incompatible composite members. Examples of relatively incompatible composite members are composite members having a considerable difference in properties such as coefficient of thermal expansion and/or Young's modulus, etc.

Connections and methods according to the invention are particularly useful for preparation of wind turbine blades. For example in the preparation of a spar for a wind turbine blade, the connections may be used for connecting a mainly glass fibre reinforced part, e.g. the base, o a mainly carbon fibre reinforced part of the spar, e.g. the main part. This is particularly useful for larger blades as the weight of a blade may be dramatically reduced, when part of the glass fibre reinforced composite is replaced by carbon fibre reinforced composite.

| Table for identification | |
|---|---|
| 2 | Overall plane of the interface between the transition zone and a composite member |
| 4 | Surface of a composite member |
| α | Angle |
| 10 | Composite member |
| 12 | Composite member |
| 13 | Transition zone |
| 14 | Layer comprising fibres having substantially the same composition as composite member 10 |
| 15 | Tow of first type fibres |
| 16 | Layer comprising fibres having substantially the same composition as composite member 12 |
| 17 | Tow of second type fibres |
| 20 | Layer having micro grading |
| 20a | Layer having micro grading |
| 20b | Layer having micro grading |
| 22 | Layer comprising fibres |
| F | Force |
| 30 | Layer comprising fibre |
| 30a, b, d | Continuous layer comprising fibres |
| 30c | Non-continuous layer comprising fibres |
| 32 | Lines indicating difference in the experienced stress from the average resin |
| 34 | The extent of the end-condition of the stress |
| 40 | Layers having substantially the same fibre composition as a composite member |
| 42 | Layers having substantially the same fibre composition as a composite member and being bend to follow the shape of the interface |
| 50 | Sheet or layer comprising first type fibres |
| 52 | Sheet or layer comprising second type fibres |
| 60 | Layers comprising first type fibres |
| 62 | Layers comprising second type fibres |
| 64 | Distance between layers comprising first type fibres and adjacent layers comprising second type fibres |
| 66 | Distance between adjacent layers comprising second type fibres |

The invention claimed is:

1. A connection for a wind turbine blade between two composites, said connection comprising:
   a first composite member comprising first fibres and a first resin;
   a second composite member comprising second fibres and a second resin, the second fibres being different than the first fibres; and
   a connection between the first and the second composite members comprising a transition zone having a layered structure,
   wherein the transition zone comprises layers comprising the first fibres and the second fibres, each of said layers having substantially the same fibre composition as either the first composite member or the second composite member; and
   in a part of the transition zone, layers comprise substantially the first fibres from the first composite member extending beyond the layers of fibres comprising substantially the second fibres of the second composite member.

2. The connection according to claim 1, wherein at least one physical property of the first composite member is significantly different from that of the second composite member.

3. The connection according to claim 2, wherein the coefficient of thermal expansion of the first composite member is significantly different from the coefficient of thermal expansion of the second composite member.

4. The connection according to claim 2, wherein a Young's modulus of the first composite member is significantly different from a Young's modulus of the second composite member.

5. The connection according to claim 1, wherein the first type fibres are selected from the group consisting of carbon fibres, glass fibres, aramid fibres, synthetic fibres, bio fibres, mineral fibres, metal fibres, boron fibres and combinations of these.

6. The connection according to claim 1, wherein the second type fibres are selected from the group consisting of carbon fibres, glass fibres, aramid fibres, synthetic fibres, bio fibres, mineral fibres, metal fibres, boron fibres and combinations of these.

7. The connection according to claim 1, wherein at least one of the first resin and the second resin are based on unsaturated polyester, polyurethane, polyvinylester, epoxy, thermoplastics, or combinations of these.

8. The connection according to claim 7, wherein the first resin and the second resin have substantially the same composition.

9. The connection according to claim 1, wherein an overall plane of the interface between the transition zone and at least one of said composite members constitutes an overall angle of less than about 10° to the surface of one of said composite members.

10. The connection according to claim 1, wherein a layer in the transition zone comprises oriented fibres.

11. The connection according to claim 1, wherein the fibres are provided as prepregs, semi-pregs, woven or non-woven fabrics, mats, preforms, pre-consolidated pre-forms, individual or groups of fibres, tows, tow-pregs or a combination of these.

12. The connection according to claim 1, wherein at least one of the composite members is at least partially uncured at the time when the connection is prepared.

13. The connection according to claim 1, wherein at least one of the composite members is substantially or fully cured at the time when the connection is prepared.

14. The connection according to claim 1, wherein the transition zone comprises a transition member.

15. The connection according to claim 14, wherein said transition member is prepared directly on at least one of the composite members.

16. The connection according to claim 14, wherein said transition member is an integrated part of at least one of the composite members.

17. The connection according to claim 14, wherein said transition member is prepared in isolation from said composite members.

18. The connection according to claim 1, wherein the layers of said layered structure of the transition zone is substantially parallel to the overall plane of the interface between the transition zone and at least one of said composite members.

19. The connection according to claim 1, wherein the transition zone comprises a macro-grading in the form of a number of layers, each comprising fibres having either substantially the same fibre composition as the first composite member or substantially the same fibre composition as the second composite member.

20. The connection according to claim 1, wherein the layers of said layered structure of the transition zone are substantially parallel to a surface of at least one of the composite members.

21. The connection according to claim 1, wherein the transition zone is integrated at least partially with the first composite member, and interlaced layers comprising fibres having substantially the same fibre composition as a second composite member extend from within said first composite member to beyond said first composite member or vice versa from a second composite member.

22. The connection according to claim 21, wherein the interlaced layers comprise fibres of a first composite member overlaying fibres of the second composite member to define an overlay distance, the overlay distance being greater than a maximum shear stress zone defined as an end of a respective fibre which when overlayed by a respective end of an adjacent fibre in the transition zone is subjected to shear stress above an average level of shear stress to which a fibre is subjected.

23. The connection according to claim 21, wherein a distance between ends of the fibre layers comprising fibres having substantially the composition of the second composite member within the first composite member is larger than an end portion of a respective fibre which is subjected to shear stress above an average shear stress of a remaining portion of the fibre.

24. The connection according to claim 1, wherein the transition zone comprises layers comprising fibres extending from the first composite member into the second composite member and/or layers comprising fibres extending from the second composite member into the first composite member.

25. A connection according to claim 1, wherein the first fibres are carbon-fibres and the second type fibres are glass-fibres or vice versa.

26. A transition member having an area enhanced for connecting to a first composite member and an area enhanced for connecting to a second composite member, said transition member comprising two layers or sheets comprising fibres, one of the layers comprising fibres substantially the same as fibres comprising the first composite member and another of the layers comprising fibres having substantially the same fibres comprising the second composite member, wherein the two layers are partially interlaced, and the fibres comprising the first composite member are different than the fibres comprising the second composite member.

27. A connection for connecting two relatively incompatible composite members, the connection comprising:
a first composite member comprising first fibres and a first resin,
a second composite member comprising second fibres and a second resin, the first composite member and the second composite member possessing different physical properties, wherein said connection comprises a transition zone having a layered structure,
wherein the transition zone comprises layers comprising fibres, each of said layers having substantially the same fibre composition as either the first composite member or the second composite member, and
in a part of the transition zone, layers comprising fibres having substantially the same fibre composition as one of the composite members extend beyond the layers of fibres comprising substantially the same fibre composition as the other composite member.

28. The connection according to claim 1, wherein the first composite member comprises a mainly carbon-fibre reinforced part for forming a spar for a wind turbine blade and the second composite member comprises a mainly glass-fibre reinforced part of the spar for a wind turbine blade.

29. The connection of claim 27, wherein the different physical properties comprises a coefficient of thermal expansion and/or Young's modulus.

30. The connection of claim 3, wherein the difference in coefficient of thermal expansion is more than $3 \times 10^{-6}$ $°C^{-1}$.

31. The connection of claim 4, wherein the difference in Young's modulus is larger than 25% of either the Young's modulus of the first composite member or the Young's modulus of the second composite member, whichever one has a lower value.

32. The connection of claim 5, wherein the first fibres are carbon-fibres.

33. The connection of claim 6, wherein the second fibres are glass-fibres.

34. The connection according to claim 9, wherein the overall angle is less than about 2° to the surface of one of said composite members.

35. The connection according to claim 10, wherein the transition zone comprises unidirectional fibres or biaxial fibres.

36. The connection of claim 17, wherein the transition member is pre-consolidated prior to connecting to said composite members.

37. The connection according to claim 19, wherein a first side of a stack of the layers of fibres is connected to the first composite member and a second side of the stack is connected to the second composite member.

38. The connection of claim 22, wherein the overlay distance of the interlace is greater than two times the extent of the end-condition of the interfacial stress between fibre layers comprising fibres having substantially the same fibre composition as the first composite member and fibre layers comprising fibres having substantially the same fibre composition as the second composite member.

39. The connection according to claim 23, wherein the distance is two times end portion.

40. The connection according to claim 25, wherein the first resin and the second resin are epoxy-based.

41. The connection for a wind turbine blade of claim 1, wherein the first fibres are composed of a composition which is different than a composition which composes the second fibres.

42. The transition member of claim 26, wherein fibres which compromise the first composite member are composed of a composition which is different than a composition which composes the fibres of the second composite member.

* * * * *